(12) United States Patent
Douguet et al.

(10) Patent No.: US 8,024,391 B2
(45) Date of Patent: Sep. 20, 2011

(54) MODULAR MULTIPLICATION METHOD WITH PRECOMPUTATION USING ONE KNOWN OPERAND

(75) Inventors: Michel Douguet, Marseilles (FR); Vincent Dupaquis, Biver (FR)

(73) Assignee: Atmel Rousset S.A.S., Rousset Cedex (FR)

(*) Notice: Subject to any disclaimer, the term of this patent is extended or adjusted under 35 U.S.C. 154(b) by 1295 days.

(21) Appl. No.: 11/556,894

(22) Filed: Nov. 6, 2006

(65) Prior Publication Data

US 2008/0109501 A1    May 8, 2008

(51) Int. Cl.
G06F 7/38 (2006.01)
G06F 7/58 (2006.01)
G06F 7/00 (2006.01)

(52) U.S. Cl. .......................... 708/491; 708/492; 708/250
(58) Field of Classification Search ........... 708/491–492
See application file for complete search history.

(56) References Cited

U.S. PATENT DOCUMENTS

| | | |
|---|---|---|
| 4,847,801 A | 7/1989 | Tong |
| 5,274,707 A | 12/1993 | Schlafly |
| 5,373,560 A | 12/1994 | Schlafly |
| 5,499,299 A | 3/1996 | Takenaka et al. |
| 5,502,665 A | 3/1996 | Im |
| 5,642,367 A | 6/1997 | Kao |
| 5,793,659 A | 8/1998 | Chen et al. |
| 5,828,590 A | 10/1998 | Chen et al. |
| 5,954,788 A | 9/1999 | Suh et al. |
| 5,999,959 A | 12/1999 | Weng et al. |
| 6,049,815 A | 4/2000 | Lambert et al. |
| 6,091,819 A | 7/2000 | Venkatesan et al. |
| 6,256,656 B1 | 7/2001 | Gossett et al. |
| 6,457,035 B1 | 9/2002 | Su et al. |
| 6,760,742 B1 | 7/2004 | Hoyle |

(Continued)

FOREIGN PATENT DOCUMENTS

WO    WO 2008/057804 A2    5/2008

OTHER PUBLICATIONS

C. H. Lim, H. S. Hwang and P.J. Lee, Fast modular reduction with precomputation, Proc. of 1997 Korea-Japan Joint Workshop on Information Security and Cryptology (JW-ISC'97), Oct. 26-28, 1997, pp. 65-79.*

(Continued)

Primary Examiner — Lewis A Bullock, Jr.
Assistant Examiner — Kevin Hughes
(74) Attorney, Agent, or Firm — Schwegman, Lundberg & Woessner, P.A.

(57) ABSTRACT

A modular multiplication method implemented in an electronic digital processing system takes advantage of the case where one of the operands W is known in advance or used multiple times with different second operands V to speed calculation. The operands V and W and the modulus M may be integers or polynomials over a variable X. A possible choice for the type of polynomials can be polynomials of the binary finite field $GF(2^N)$. Once operand W is loaded into a data storage location, a value $P=\lfloor W \cdot X^{n+\delta}/M \rfloor$ is pre-computed by the processing system. Then when a second operand V is loaded, the quotient $\hat{q}$ for the product $V \cdot W$ being reduced modulo M is quickly estimated, $\hat{q}=\lfloor V \cdot P/X^{n+\delta} \rfloor$, optionally randomized, $q'=\hat{q}-E$, and can be used to obtain the remainder $r'=V \cdot W - q' \cdot M$, which is congruent to $(V \cdot M)$ mod M. A final reduction can be carried out, and the later steps repeated with other second operands V.

31 Claims, 3 Drawing Sheets

U.S. PATENT DOCUMENTS

| | | |
|---|---|---|
| 6,766,345 B2 | 7/2004 | Stein et al. |
| 6,917,218 B2 | 7/2005 | Kim et al. |
| 6,920,473 B2 | 7/2005 | Elbe et al. |
| 6,925,479 B2 | 8/2005 | Chen et al. |
| 6,957,243 B2 | 10/2005 | Chen |
| 7,003,538 B2 | 2/2006 | Drescher |
| 2002/0039418 A1 | 4/2002 | Dror et al. |
| 2003/0123655 A1 | 7/2003 | Lambert et al. |
| 2004/0066934 A1 | 4/2004 | Chen |
| 2004/0111459 A1 | 6/2004 | Stojancic |
| 2004/0236813 A1 | 11/2004 | Grinchuk |
| 2005/0105723 A1* | 5/2005 | Dupaquis et al. ............ 380/59 |
| 2005/0149595 A1 | 7/2005 | Fischer et al. |
| 2006/0061795 A1 | 3/2006 | Walmsley |

OTHER PUBLICATIONS

Koc, Cetin K. and Acar, Tolga, Montgomery Multiplication in GF(2k), 1998, Designs, Codes and Cryptography, Springer Netherlands, 57-69.*

"International Application Serial No. PCT/US2007/82713, International Search Report mailed Apr. 30, 2008", 2 pgs.

"International Application Serial No. PCT/US2007/82713, Written Opinion mailed Apr. 30, 2008", 6 pgs.

* cited by examiner

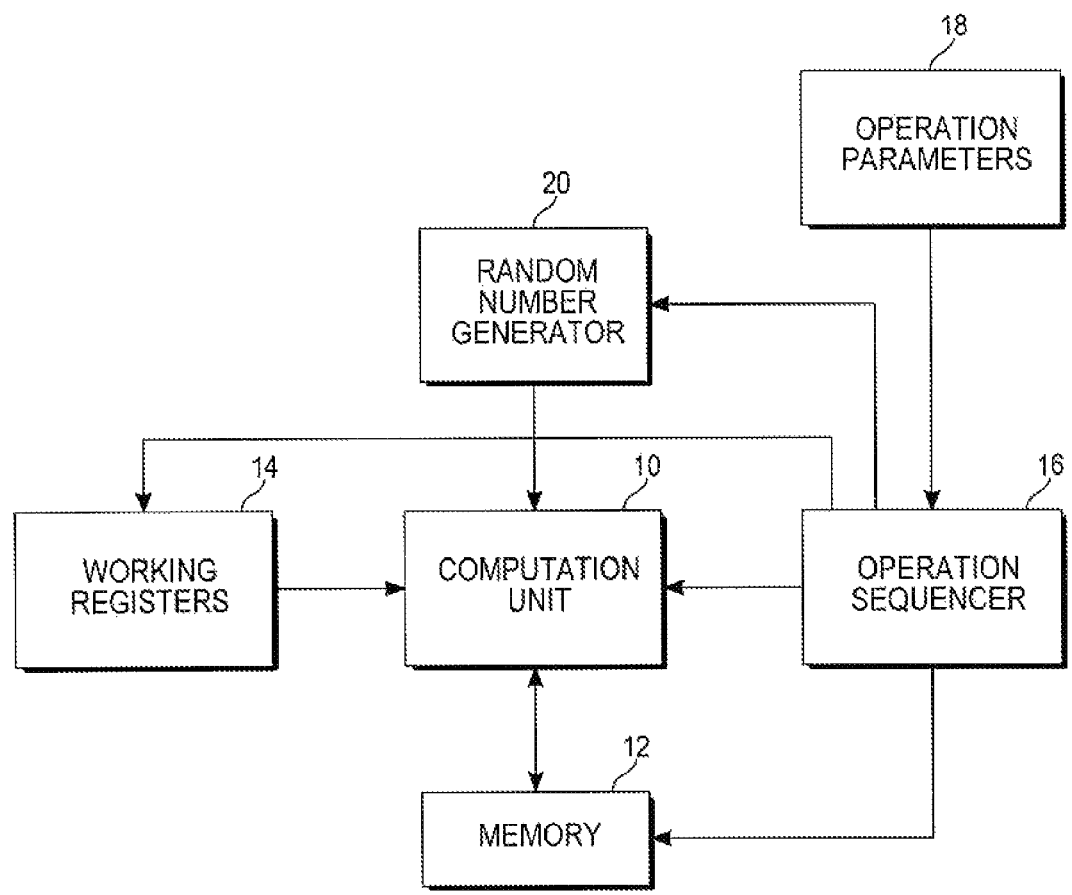
Fig._1

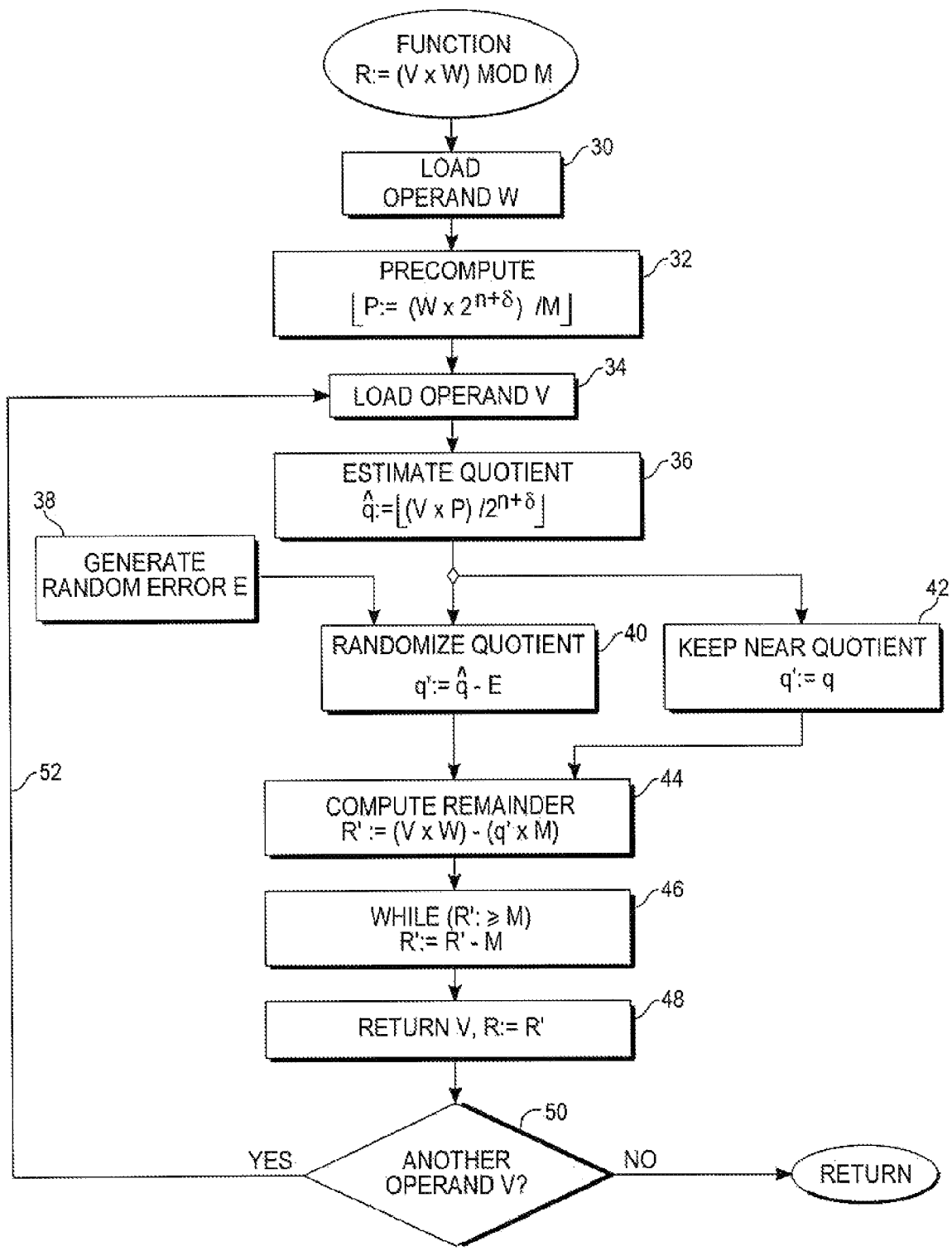
Fig. _2

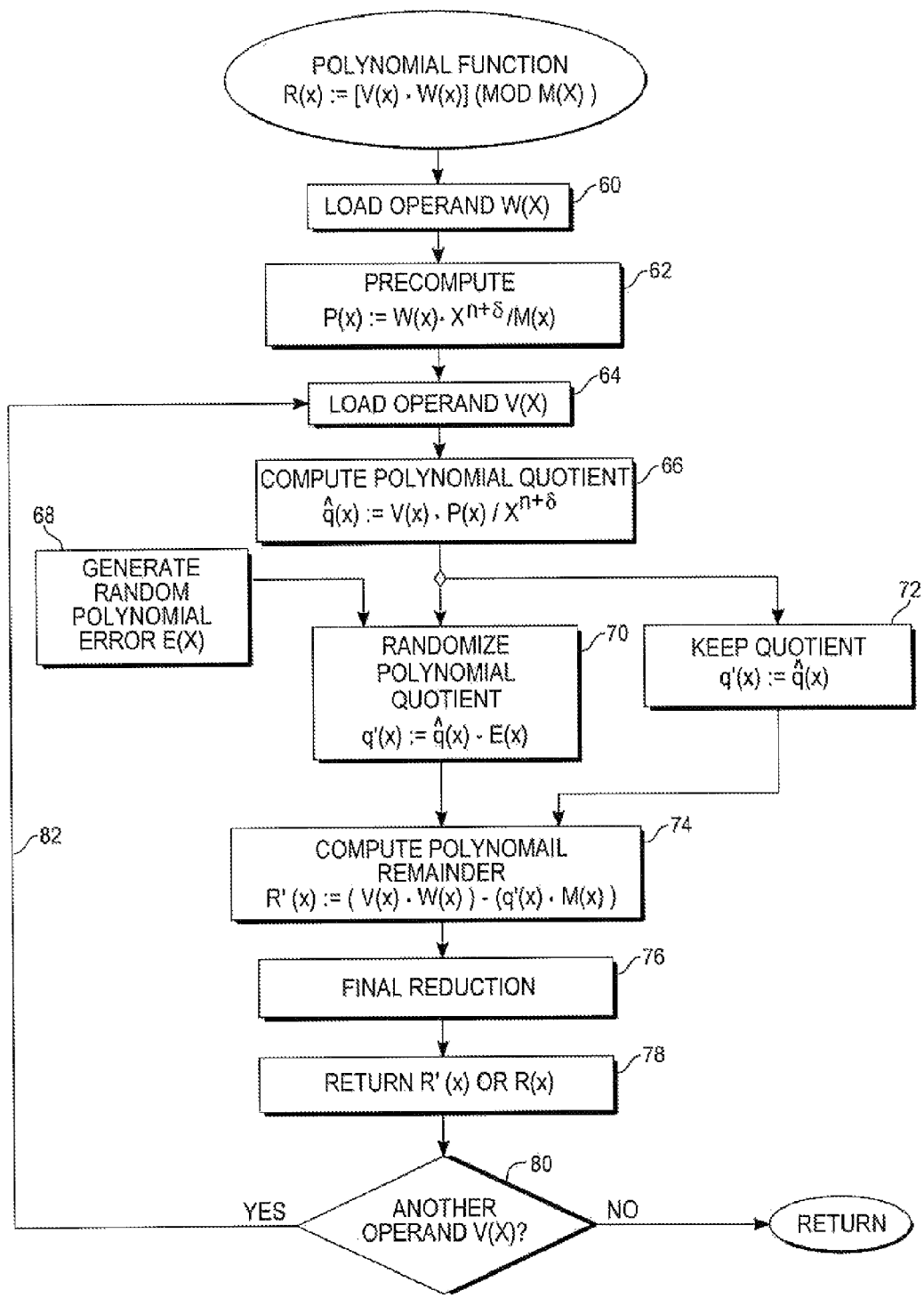
Fig._3

MODULAR MULTIPLICATION METHOD WITH PRECOMPUTATION USING ONE KNOWN OPERAND

TECHNICAL FIELD

The present invention relates to methods or arrangements for processing numerical data by electrical programmable computers, digital processing systems, logic circuitry, or similar electronic hardware together with any associated software, and in particular relates to arithmetic processing and calculating methods involving finite field, residue or congruence operations, including modular multiplication operations upon integers or polynomials, especially methods based upon or derived from the Barrett reduction method.

BACKGROUND ART

Numerous cryptographic algorithms make use of large-integer multiplication (or exponentiation) and reduction of the product to a residue value that is congruent for a specified modulus that is related to the cryptographic key. Some crypotographic algorithms, including the AES/Rijndael block cipher and also those based on discrete logarithms and elliptic curves, perform arithmetic operations on polynomials in a finite field, such as the binary field $GF(2^n)$, including multiplication (or exponentiation) and modular reduction operations on such polynomials.

Mathematical computations in cryptographic algorithms, especially those performed by hardware-implemented cryptographic systems (such as RISC-based smart cards), may be susceptible to various side-channel attacks, including power analysis and timing attacks. An attacker externally monitors aspects of the hardware that are accessible, such as current through chip pads or electromagnetic emissions from a chip, in order to obtain information about internal operations which may be subjected to various analyses in an effort to uncover the encryption key. Therefore, it is important that computations be secured so that information about the key cannot be obtained.

Typically, secure microcontrollers for smart cards use various kinds of hardware-based countermeasures to thwart such attacks. While some software-level countermeasures introduced into a cryptographic algorithm itself might also be considered, it is very important that any such countermeasures not adversely affect the speed or accuracy of the underlying computations. Not all of the internal operations of a cryptographic algorithm are as readily adaptable so as to incorporate software countermeasures without appreciable slowing and without jeopardizing accuracy of a final result.

Arithmetic operations in particular, including modular multiplication, either upon integers or upon polynomials with integer coefficients, generally require a specific result from operating upon given operands. Any changes that would obtain an erroneous final result would clearly be unwelcome. At the same time, it is important that these computations be fast and accurate. Multiplication and reduction, whether operated upon large integers or upon polynomials in a finite field, is usually the most computationally intensive portion of a cryptographic algorithm. In electronic digital hardware, various computational methods have been developed for efficiently performing modular multiplication, including those based upon the Barrett reduction method.

One particular case that frequently occurs in cryptographic applications is where one of the operands of a modular multiplication (or exponentiation) operation is known in advance or used several times. It would be desirable to take advantage of such occurrences in order to speed up the computation.

SUMMARY DISCLOSURE

The present invention is a method implemented in an electronic digital processing system that performs fast modular multiplication computations upon integers or polynomials. In particular, a precomputation is carried out using one operand that is known in advance, in order that the modular reduction quotient to be quickly estimated for any given product involving that operand. For added cryptographic security, the estimated quotient so obtained can be optionally reduced by a random value. The reduced product will then be larger than or equal to, yet still congruent to, the exact residue value for the modular multiplication. In some cryptographic algorithms, it is possible to work with the larger randomized, but congruent, value without affecting the final result. In other algorithms, the exact residue value may need to be found using a few additional subtractions with the modulus, but the intermediate randomization is still useful in resisting cryptoanalytic attacks.

More specifically, where V and W are two operands of which W is known in advance, M is the modulus, and a product congruent to $(V \times W) \mod M$ is to be found, the method precomputes $P = \lfloor (W \times 2^{n+\delta})/M \rfloor$, where n is greater than the size of the larger of W and M. The choice of small integer increment δ depends upon the maximum size of the other operand (the one not known in advance), and determines the permissible rounding error obtained for the quotient estimation. For each modular multiplication involving the pre-known operand W, an estimated quotient $\hat{q} = \lfloor (V \times P)/2^{n+\delta} \rfloor$ is obtained. Then a remainder value $\hat{r} = V \times W - \hat{q} \times M$ is calculated. If the estimated quotient is reduced by a random value, $q' = \hat{q} - E$, then the randomized estimated quotient q' is used to obtain a remainder value r' congruent with the exact residue.

This sequence of steps can be carried out using either integer or polynomial operands. For polynomial operands over a variable X, when calculating both P and $\hat{q}$, $X^{n+\delta}$ replaces $2^{n+\delta}$. To clarify the differences between integers and polynomials: (1) For integers, if the maximum possible size of $V < 2^{n+\phi}$, and if $\delta \geq \phi$, then the result $\hat{q}$ is less than or equal to the actual quotient Q with a maximum error of 1, i.e., $Q - 1 \leq \hat{q} \leq Q$. But if $\delta < \phi$, the result $\hat{q}$ is less than or equal to the actual quotient Q with a maximum error defined by $Q - 2^{\phi-\delta} \leq \hat{q} \leq Q$; (2) For polynomials, if the maximum size (i.e., degree) of polynomial V(x) is such that $\deg(V(x)) < n + \phi$, and if $\delta \geq \phi - 1$, then the result $\hat{q}$ is equal to the actual quotient Q. But if $\delta < \phi - 1$, the result $\hat{q}$ can be different from the actual quotient Q with a maximum error $\deg(Q - \hat{q}) \leq \phi - \delta - 2$.

The computation method is easily implemented with processing hardware, or by executing an equivalent firmware or software program in a data processor or computer. Exemplary hardware used to execute the modular multiplication may include an arithmetic logic unit (ALU) with multiplication-accumulate (MAC) circuitry, which might be selectable to perform either natural or polynomial arithmetic, and which could, if desired, be dedicated to finite field operations. Such a computation unit, with memory access, operates under the control of an operation sequencer executing firmware to carry out the modular multiplication steps. A random number generator may be provided to inject a random value into an estimated quotient value used for the modular reduction of the product. It is also well within the level of skill of hardware system designers to implement the method entirely in hardware, using, for example, a field programmable gate array (FPGA) or application-specific integrated circuit (ASIC).

BRIEF DESCRIPTION OF THE DRAWINGS

FIG. 1 is schematic plan view of exemplary processor hardware for use in executing the modular multiplication in accord with the present invention.

FIG. 2 is a flow diagram illustrating the general steps in the modular multiplication method of the present invention for integers.

FIG. 3 is a flow diagram illustrating the general steps in the modular multiplication method of the present invention for polynomials.

DETAILED DESCRIPTION

With reference to FIG. 1, computational processor hardware for executing modular multiplication in accord with the present invention may include an arithmetic-logic unit (ALU) 10, or similar computational circuitry containing a hardware multiplier, for executing numerical operations, including multiplication, upon the provided operands. The ALU 10 generally has access to memory (RAM) 12 and various working registers 14. An operation sequencer 16 comprises logic circuitry for controlling the ALU, including data transfers to and from the memory 12 and registers 14, in accord with firmware or software instructions for the set of operations used to carry out the modular multiplication. Operation sequencer 16 may access operation parameters in the form of pointers stored in registers 18 that enable the operation sequencer 16 to locate an operand within the RAM 12, as well as information such as the operand sizes, carry injection control information, the destination address of intermediate results, etc. The hardware may also include a pseudo-random number generator circuit 20 that performs calculations and outputs a random numerical value (interpreted as either an integer or a polynomial). This random generator 20 may be accessed by the ALU 10, as directed by the operation sequencer in accord with program instructions implementing the modular multiplication method of the present invention, in order to inject a randomized error quantity Rand into the quotient estimation, as described herein.

Modular multiplication of two operands, whether of integers or polynomials, typically consists in calculating a product of the two numbers, and then processing a modular reduction of the product. Modular reduction generally solves $r \equiv X$ mod $M \equiv X - \lfloor X/M \rfloor M$, where r is the residue value to be found which is congruent to X for a modulus M, and the symbol $\lfloor a \rfloor$ represents the floor function (the largest integer $\leq a$) so that $q = \lfloor X/M \rfloor$ corresponds to an integer division operation to find a quotient q. In the present case, the numerical value X, whether an integer or a polynomial, is the product of two operands, $X = V \times W$, where the operands V and W are themselves either integers or polynomials. Thus, the residue $r = V \times W - q \times M$. Barrett's reduction method involves pre-calculating and storing a scaled estimate of the modulus' reciprocal, $M^{-1}$, and replacing the long division with multiplications and word shifts to obtain an estimated quotient $\hat{q}$. Obtaining the estimated quotient $\hat{q}$ is much faster than calculating the true quotient. When the estimated quotient $\hat{q}$ is used in place of the true quotient, the resulting remainder $\hat{r}$ will be slightly larger than, but congruent with, the residue value r. The exact residue value r, if desired, can be obtained from the remainder $\hat{r}$ by a final strict reduction. The present invention modifies this approach still further when one of the operands is known in advance or is used many times in the execution of a given algorithm.

With reference to FIG. 2, in order to carry out a processor-implemented function $R := (V \times W) \mod M$, on one or more operands V, where the other operand W is known in advance, begin by loading (step 30) the operand W that is known in advance, then pre-computing (step 32) a value $P := \lfloor (W \times 2^{n+\delta})/M \rfloor$. This value P will be used for efficiently estimating quotient values needed to quickly reduce the products of W with one or more operands V. The integer n in the expression $2^{n+\delta}$ is the size in bits of the larger of the known operand W and the modulus M, so that $W \leq 2^n$ and $M \leq 2^n$. The choice of the integer $\delta$ depends upon the maximum possible size of the other operand V. If $V < 2^{n-\phi}$, then we can choose $\delta \geq \phi$ and we will obtain a good estimated quotient as our estimate, that verifies $Q - 1 \leq \hat{q} \leq Q$, where Q is the real quotient. Alternatively, we can choose $\delta < \phi$ for a faster quotient estimation, but with a greater degree of rounding, so that the estimated quotient will differ from the exact quotient up to some maximum error determined by our choice of $\delta$. The choice $\delta < \phi$ may be made, for example, if a bigger error on the quotient is accepted, or if a randomization is applied. If $\delta < \phi$, the result is less than or equal to the real quotient with a error boundary $Q - 2^{\phi - \delta} \leq \hat{q} \leq Q$, where Q is the real quotient. If a randomization is applied with a maximum boundary, the error boundary may be equal or near the random boundary. If $0 \leq E < 2^s$, where E is the random value, then we can take $\phi - \delta = s$, so $\delta = \phi - s$. As the values of $\delta$ are defined by inequalities, it is possible to round them to more practical values, if needed.

Next, we load (step 34) a first of the operands V for which we wish to calculate a modular product with pre-known operand W. The quotient is estimated (step 36) as $\hat{q} := \lfloor (V \times P)/2^{n+\delta} \rfloor$. The estimated quotient $\hat{q}$ can be optional diminished (step 40) by a random value E generated (step 38) by a pseudo-random number generator circuit 20 (in FIG. 1), $q' := \hat{q} - E$. As an option, random value E may have a size of no more than a half-word so as to limit the potential error contributed by that random value E. Randomizing provides a layer of security against various cryptoanalytic attacks that rely upon consistency in power usage to determine the modulus M, which may be derived from or otherwise related to a cryptographic key. Introducing the random value E, causes the modular multiplication operation to differ from one execution to the next, while still producing a congruent result R'. Alternatively, we may keep near the quotient q by leaving the estimated quotient unchanged, $q' := \hat{q}$.

In either case, the quotient value q' is used to compute a remainder R' in the modular multiplication operation (step 44), where $R' := (V \times W) - (q' \times M)$. The remainder R' will usually be larger than the modulus M, because the quotient value used q' is not exactly equal to actual quotient q. Nevertheless R' is congruent to the residue value for the modular multiplication. Depending on the needs of the particular application, the residue R can be calculated from the remainder R' by applying substractions (step 46) of the modulus M until the number is smaller than the modulus M. Then the residue value R can be returned (step 48), possibly together with the particular operand V, for use in the rest of the cryptographic system. Alternatively, if a final reduction to the residue is not required, the remainder R' could be returned and used in the further calculations, since it is congruent modulo M with the residue value R.

Next, one can check (step 50) whether there are other operands V to be used in a modular multiplication with the same pre-known operand W. If so, the procedure may return (path 52) to step 34 and load the next operand V. If there are no additional operands V, the procedure may return to the main program.

With reference to FIG. 3, the modular multiplication operation may be adapted for operation upon polynomial operands, e.g., in a binary finite field $GF(2^N)$. Modular arithmetic with polynomials is similar in some respects to modular arithmetic with integers, although extending this to polynomials over a binary finite field $GF(2^N)$ requires certain modifications to the basic operation. Let us first introduce polynomials over a field. To any multiple $(a_{m-1}, \ldots a_1, a_0)$ of member of a field F, we can associate a polynomial in x of degree (m−1): $a_{m-1} x^{m-1} + \ldots a_1 x^1 + a_0 x^0$. In the case of any binary finite field, the members of the field are {0, 1} and so the polynomial coefficients $a_t$ are likewise 0 or 1. This concept adapts particularly well to computer hardware and other digital processing circuitry, which are binary in nature, since each bit can be interpreted as a finite field element. For example, we can associate each binary byte value $[a_7 a_6 a_5 a_4 a_3 a_2 a_1 a_0]$ with a corresponding polynomial over $GF(2^N)$ of degree 7 or less: $a_7 x^7 + a_6 x^6 + a_5 x^5 + a_4 x^4 + a_3 x^3 + a_2 x^2 + a_1 x + a_0$. Hence, e.g., the byte value [01100011] is interpreted as the binary polynomial $x^6+x^5+x+1$. Longer multi-byte sequences may likewise be interpreted as polynomials of higher degree, provided that the polynomial degree (m−1) is less than N in order for the polynomial to belong to the field $GF(2^N)$. (Note: when comparing the relative sizes of polynomials, the comparison is performed degree by degree, starting with the polynomial coefficients for the largest degree in x). Addition and subtraction of polynomials in a field are carried out in the usual manner of adding or subtracting the coefficients for each degree separately, $$\sum_i a_i x^i \pm \sum_i b_i x^i = \sum_i (a_i \pm b_i) x^i.$$

However, for any binary field, the members are {0, 1}, so that addition and subtraction of the field elements are performed modulo 2 (0±0=0, 0±1=1, 1±0=1, 1±1=0). Note that, in this case, subtraction is identical to addition. In computer hardware, addition/subtraction modulo 2 is performed with a logical XOR operation upon the array of bits. For example, $(x^6+x^4+x^2+x+1)+(x^7+x+1)=(x^7+x^6+x^4+x^2)$; or in binary notation $[01010111] \oplus [10000011] = [11010100]$.

Polynomial multiplication is ordinarily defined (for infinite fields) by:

$$\left(\sum_i a_i x^i\right) \cdot \left(\sum_j b_j x^j\right) = \sum_k c_k x^k,$$

where the coefficient $c_k$ is given by the convolution:

$$c_k = \sum_{i+j=k} a_i b_j.$$

(Again, in a binary field, the summation is performed modulo 2). However, in a finite field, this definition must be modified in order to ensure that the product also belongs to the field. In particular, ordinary polynomial multiplication is followed by modular reduction by a modulus m(x) of degree n (where n is the dimension of the finite field, as in $GF(2^n)$. The modulus m(x) is preferably chosen to be an irreducible polynomial (the polynomial analogue of a prime number, i.e. one that cannot be factored into nontrivial polynomials over the same field). For example, in the AES/Rijndael symmetric block cipher, operations are performed on bytes (polynomials of degree 7 or less) in the binary finite field $GF(2^8)$, using the particular irreducible polynomial $m(x)=x^8+x^4+x^3+x+1$ as the chosen basis for modular reduction when performing polynomial multiplication. As an example of polynomial multiplication in a binary finite field using the particular m(x) specified for AES: $(x^6+x^4+x^2+x+1)\cdot(x^7+x+1)=x^{13}+x^{11}+x^9+x^8+x^6+x^5+x^4+x^3+1)$, which after reduction, gives $(x^7+x^6+1)$.

Let F[x] be the set of polynomials all of whose coefficients are members of a field F. If the modulus m(x) is a polynomial of degree d in F[x], then for polynomials p(x), r(x)∈F[x], we say that p(x) is congruent to r(x) modulo m(x), written as p(x)≡r(x) (mod m(x)), if and only if m(x) divides the polynomial p(x)−r(x); in other words p(x)−r(x) is a polynomial multiple of m(x), that is, p(x)−r(x)=q(x)·m(x) for some polynomial q(x)∈F[x]. Equivalently, p(x) and r(x) have the same remainder upon division by m(x). Modular reduction of a polynomial p(x), which could be an ordinary product of polynomials a(x) and b(x) in F[x], that is, p(x)=a(x)·b(x), involves finding a polynomial quotient q(x) such that the remainder or residue r(x) is a polynomial of degree less than m(x), that is, deg(r(x))<d. The polynomial residue r(x), which is congruent with p(x), is the polynomial value we ultimately want. In the binary finite field $GF(2^n)$, m(x) will be an irreducible polynomial of degree n and the residue polynomial r(x) that is sought will be of degree less than n; but p(x) and hence also q(x) can be any degree, and at least the polynomial p(x) to be reduced is often of degree larger than m, as for example when p(x) is a product. In any case, the basic problem in any modular reduction method is in efficiently obtaining a quotient, especially for polynomial p(x) and m(x) of larger degree.

As shown in FIG. 3, a modular multiplication method in accord with the present invention, where one of the polynomial operands w(x) is known in advance, begins by loading (step 60) that known operand w(x), then pre-computing (step 62) a polynomial $p(x):=[w(x) \cdot x^{n+\delta}]/m(x)$. The polynomial p(x) will be used to efficiently compute a polynomial quotient q(x) for all modular multiplication operations involving the operand w(x). The other operand v(x), not necessarily known in advance, is loaded (step 64) and the polynomial quotient q(x) associated with the product v(x)·w(x) is computed (step 66) as:

$$q(x):=v(x)\cdot p(x)/x^{n+\delta}.$$

The q(x) can be randomized (step 40) by subtracting a random polynomial value E(x), q'(x):=q(x)−E(x). The random polynomial value E(x) may be generated by any known random or pseudo-random number generator (hardware or software), where the binary value generated is interpreted as a polynomial in the manner already described above. As an option, the random polynomial value E(x) may be constrained to fall within some specified range, such a 0<deg(E(x))<w/2, where here w is the word size.

Next, the modular multiplication operation is carried out (step 44), producing a remainder r'(x):

$$r'(x):=(v(x)\cdot w(x))-(q'(x)\cdot m(x)).$$

This remainder r'(x) will be congruent modulo m(x) with the residue value r(x). Note that the choice of δ in the equations given above will determine whether the quotient is exact. If deg(v(x))<n+φ, and δ≧φ−1, then the polynomial q(x) will equal the exact quotient, prior to any randomization. If δ<φ−1, then q(x) will differ from the exact quotient, but deg(r'(x))− deg(r(x))) will be less than a maximum limit defined by $\delta$, deg(Q−q^)≦$\phi$−$\delta$−2, where Q is the real quotient. Depending upon the needs of the particular application, the residue polynomial r(x) can be calculated from the remainder r'(x) by applying ordinary $GF(2^N)$ polynomial reduction with the modulus m(x) to obtain a polynomial smaller than m(x). The polynomial remainder r'(x) or the residue r(x) may be returned for further use by the application. If modular multiplication on another polynomial operand v(x) is to be carried out (step 80) using the same w(x), then the procedure goes back (path 82) to loading (step 64) the next v(x).

The invention claimed is:

1. A computer hardware-implemented modular multiplication method, comprising:
   loading a first numerical operand W into data storage accessible to a processor unit, wherein W is a first operand to be multiplied by a second operand;
   pre-computing, using the processor unit, and storing a numerical value P, where $P=\lfloor(W \cdot X^{n+\delta})/M\rfloor$ for the operand W and a modulus M, where X is selected to represent either a numerical constant or a polynomial variable, n is an integer representing a size of the larger of W and M, and where $\delta$ is a selected constant greater than 1;
   loading a second numerical operand V into the data storage, wherein V is the second operand to be multiplied by W, where $V<2^{n+\phi}$, and the constant $\delta$ is chosen so that $\delta \geq \phi$;
   computing, using the processor unit, an estimated quotient q^ for the product (V·W) to be reduced modulo M, wherein the estimated quotient $\hat{q}=\lfloor(V \cdot P)/X^{n+\delta}\rfloor$, where q^ is equal or lower by one to the actual quotient; and
   calculating, using the processor unit, a remainder r'=(V·W)−(q'·M), where q' is a quotient value derived from the estimated quotient q^, said remainder r' being congruent to (V·W) mod M.

2. The method as in claim 1, wherein the operands V and W and the modulus M are integers represented in computer hardware in binary form, and X is the integer 2, the pre-computed numerical value P, the estimated quotient q^ and the calculated remainder r' also being integers.

3. The method as in claim 1, wherein the operands V and W, the modulus M, the pre-computed numerical value P, the estimated quotient q^, and the calculated remainder r' are polynomials over variable X.

4. The method as in claim 3, wherein all computations upon the polynomials are performed in a finite field.

5. The method as in claim 3, wherein all computations upon the polynomials are performed in $GF(2^N)$.

6. The method as in claim 1, wherein q'=q^ is used.

7. The method as in claim 1, wherein q' is derived from the estimated q^ by applying a random numerical value E to the estimated quotient, such that q'=q^−E.

8. The method as in claim 7, wherein pseudo-random number generating circuitry generates the random numerical value E.

9. The method as in claim 7, wherein the random numerical value E is limited in size to at most one-half word.

10. The method as in claim 1, wherein, for polynomials, $V<X^{m+\phi}$, and the constant $\delta$ is chosen so that $\delta \geq \phi-1$, the estimated quotient q^ being equal to the actual quotient.

11. The method as in claim 1, wherein, for polynomials, $V<X^{n+\phi}$, and the constant $\delta$ is chosen so that $\delta<\phi-1$, the estimated quotient q^ being an underestimation of the actual quotient Q within a maximum range determined by $\delta$ and $\phi$, such that deg(Q−q^)≧$\phi$−$\delta$−2.

12. The method as in claim 1, wherein, for integers, $V<2^{n+\phi}$, and the constant $\delta$ is chosen so that $\delta<\phi$, the estimated quotient q^ being an underestimation of the actual quotient Q within a maximum range determined by $\delta$ and $\phi$, such that $Q-2^{\phi-\delta} \leq \hat{q} \leq Q$.

13. The method as in claim 1, further executing a final reduction modulo M upon the remainder r'.

14. The method as in claim 1, further comprising carrying at least one additional modular multiplication using the same first operand W and the same pre-computed numerical value P, but with another second operand V.

15. The method as in claim 1, wherein the modular multiplication of operands V and W is part of a computer hardware-implemented cryptography program.

16. A computer hardware-implemented modular multiplication method, comprising:
   loading a first integer operand W into data storage accessible to a processor unit wherein W is a first operand to be multiplied by a second operand;
   pre-computing, using the processor unit, and storing an integer P, where $P=\lfloor(W \cdot 2^{n+\delta})/M\rfloor$ for the operand W and a modulus M, where n is an integer representing a bit size of the larger of W and M, and where $\delta$ is a selected constant greater than 1;
   loading a second integer operand V into the data storage, wherein V is the second operand to be multiplied by W, where $V<2^{n+\phi}$, and the constant $\delta$ is chosen so that $\delta \geq \phi$;
   computing, using the processor unit, an estimated quotient q^ for the product (V·W) to be reduced modulo M, wherein the estimated quotient $\hat{q}=\lfloor(V \cdot P)/2^{n+\delta}\rfloor$, where q^ is equal or lower by one to the actual quotient; and
   calculating, using the processor unit, a remainder r'=(V·W)−(q'·M), where q' is a quotient value derived from the estimated quotient q^, said remainder r' being congruent to (V·W) mod M.

17. The method as in claim 16, wherein q'=q^ is used.

18. The method as in claim 16, wherein q' is derived from the estimated q^ by applying a random integer value E to the estimated quotient, such that q=q^−E.

19. The method as in claim 18, wherein pseudo-random number generating circuitry generates the random integer value E.

20. The method as in claim 18, wherein the random integer value E is limited in bit size to at most one-half word.

21. The method as in claim 16, wherein $V<2^{n+\phi}$, and the constant $\delta$ is chosen so that $\delta<\phi$, the estimated quotient q^ being an underestimation of the actual quotient Q within a maximum range determined by $\delta$, and $\phi$ such that $Q-2^{\phi-\delta} \leq \hat{q} \leq Q$.

22. The method as in claim 16, further executing a final reduction modulo M upon the remainder r' as a series of subtractions r':=r'−M until r'<M.

23. The method as in claim 16, further comprising carrying at least one additional modular multiplication using the same first operand W and the same pre-computed numerical value P, but with another second operand V.

24. A computer hardware-implemented modular polynomial multiplication method in the binary finite field $GF(2^N)$, comprising:
   loading a first polynomial operand w(x) into data storage accessible to a processor unit, wherein w(x) is a first operand to be multiplied by a second operand;
   pre-computing, using the processor unit, and storing a polynomial p(x), where $p(x)=\lfloor(w(x)x^{n+\delta}/m(x)\rfloor$ for the operand w(x) and a polynomial modulus m(x), where n is an integer representing the polynomial degree of the larger of w(x) and m(x), and where $\delta$ is a selected constant greater than 1;

loading a second polynomial operand v(x) into the data storage, wherein v(x) is the second operand to be multiplied by W where $\deg(v(x)) < n+\phi$, and the constant $\delta$ is chosen so that $\delta \geq \phi-1$;

computing, using the processor unit, an estimated polynomial quotient $\hat{q}(x)$ for the product $(v(x)w(x))$ to be reduced modulo m(x), wherein the estimated quotient $\hat{q}(x) \lfloor (v(x) \cdot p(x))/x^{n+\delta} \rfloor$, where $\hat{q}(x)$ is equal to the actual quotient; and calculating, using the processor unit, a polynomial remainder $r'(x)=(v(x)\cdot w(x))-(q'(x)\cdot m(x))$, where $q'(x)$ is a polynomial quotient value derived from the estimated polynomial quotient $\hat{q}(x)$, said remainder $r'(x)$ being congruent to $(v(x)\cdot w(x))\bmod m(x)$.

25. The method as in claim 24, wherein $q'(x)=\hat{q}(x)$ is used.

26. The method as in claim 24, wherein $q'(x)$ is derived from the estimated $\hat{q}(x)$ by applying a random polynomial value E(x) to the estimated polynomial quotient, such that $q'(x)=\hat{q}(x)-E(x)$.

27. The method as in claim 26, wherein pseudo-random number generating circuitry generates a random numerical value E which is interpreted as the polynomial E(x) in the binary finite field $GF(2^N)$, where each bit value in E represents a different polynomial degree of x.

28. The method as in claim 26, wherein the random polynomial value E is limited in degree to at most one-half word.

29. The method as in claim 24, wherein the estimated polynomial quotient $\hat{q}(x)$ being an underestimation of the actual quotient Q with the difference $(Q-\hat{q}(x))$ having a maximum degree determined by $\delta$ and $\phi$, such that $\deg(Q-\hat{q}(x)) \leq \phi-\delta-2$.

30. The method as in claim 24, further executing a final reduction modulo x) upon the polynomial remainder $r'(x)$.

31. The method as in claim 24, further comprising carrying at least one additional modular multiplication using the same first polynomial operand w(x) and the same pre-computed polynomial value p(x), but with another second polynomial operand v(x).

* * * * *

UNITED STATES PATENT AND TRADEMARK OFFICE
CERTIFICATE OF CORRECTION

PATENT NO. : 8,024,391 B2
APPLICATION NO. : 11/556894
DATED : September 20, 2011
INVENTOR(S) : Michel Douguet et al.

It is certified that error appears in the above-identified patent and that said Letters Patent is hereby corrected as shown below:

On the face page, in field (57), under "Abstract", in column 2, line 14, delete "(V·M)" and insert -- (V·W) --, therefor.

In column 1, lines 23-24, delete "crypotographic" and insert -- cryptographic --, therefor.

In column 2, line 46, delete " $Q-1 \leqq q\hat{}\leqq q\hat{}\leqq Q.$ " and insert -- $Q-1 \leq q\hat{}\leq Q.$ --, therefor.

In column 3, line 6, after "FIG. 1 is" insert -- a --.

In column 4, line 15, delete "$V<2^{n-\varphi}$," and insert -- $V<2^{n+\varphi}$, --, therefor.

In column 4, line 57, delete "substractions" and insert -- subtractions --, therefor.

In column 5, line 11, delete "member" and insert -- members --, therefor.

In column 5, line 21, delete "$a_2x_2$" and insert -- $a_2x^2$ --, therefor.

In column 6, line 10, delete "$x^{13}$" and insert -- $(x^{13}$ --, therefor.

In column 6, line 34, delete "larger" and insert -- large --, therefor.

In column 6, line 56, delete "such a" and insert -- such as --, therefor.

In column 7, line 59, in Claim 10, delete "$V<X^{m+\varphi}$," and insert -- $V<X^{n+\varphi}$, --, therefor.

Signed and Sealed this
Eighth Day of November, 2011

David J. Kappos
*Director of the United States Patent and Trademark Office*

CERTIFICATE OF CORRECTION (continued)
U.S. Pat. No. 8,024,391 B2

In column 7, line 65, in Claim 11, delete "$deg(Q-q\hat{\ })\geqq\phi-\delta-2.$" and insert -- $deg(Q-q\hat{\ }) \leq \phi-\delta-2.$ --, therefor.

In column 8, line 38, in Claim 18, delete "$q^*=q\hat{\ }-E.$" and insert -- $q^* = q\hat{\ }-E.$ --, therefor.

In column 8, line 47, in Claim 21, delete "δ, and φ" and insert -- δ and φ, --, therefor.

In column 8, line 63, in Claim 24, delete "$\lfloor (w(x)x^{n+\delta}/m(x) \rfloor$" and insert -- $\lfloor (w(x)x^{n+\delta})/m(x) \rfloor$ --, therefor.

In column 9, line 3, in Claim 24, delete "W" and insert -- W, --, therefor.

In column 9, line 8, in Claim 24, delete "$q\hat{\ }(x) \lfloor (v(x)\cdot p(x))/x^{n+\delta} \rfloor$" and insert -- $q\hat{\ }(x) = \lfloor (v(x)\cdot p(x))/x^{n+\delta} \rfloor$ --, therefor.

In column 10, lines 9-10, in Claim 29, delete "$deg(Q-q\hat{\ }(x))\leqq\phi-\delta-2.$" and insert -- $deg(Q-q\hat{\ }(x))\leqq\phi-\delta-2.$ --, therefor.

In column 10, line 12, in Claim 30, delete "x)" and insert -- m(x) --, therefor.